United States Patent
Williams et al.

(10) Patent No.: US 10,277,512 B1
(45) Date of Patent: Apr. 30, 2019

(54) METHOD, DEVICE, AND COMPUTER-READABLE MEDIUM FOR AUTOMATIC NETWORK TRAFFIC ENGINEERING

(71) Applicant: STATE FARM MUTUAL AUTOMOBILE INSURANCE COMPANY, Bloomington, IL (US)

(72) Inventors: Scott A. Williams, Bloomington, IL (US); Scott Kline, Normal, IL (US); Daniel A. Riedner, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 440 days.

(21) Appl. No.: 14/976,242

(22) Filed: Dec. 21, 2015

Related U.S. Application Data (60) Provisional application No. 62/111,446, filed on Feb. 3, 2015, provisional application No. 62/147,749, filed on Apr. 15, 2015.

(51) Int. Cl.
*G06F 15/16* (2006.01)
*H04L 12/803* (2013.01)
*H04L 12/805* (2013.01)
*H04L 12/841* (2013.01)
*H04L 12/815* (2013.01)

(52) U.S. Cl.
CPC .......... *H04L 47/122* (2013.01); *H04L 47/225* (2013.01); *H04L 47/283* (2013.01); *H04L 47/36* (2013.01)

(58) Field of Classification Search
CPC combination set(s) only.
See application file for complete search history.

(56) References Cited

U.S. PATENT DOCUMENTS

| | | | |
|---|---|---|---|
| 6,400,686 B1 * | 6/2002 | Ghanwani | H04L 47/263 370/232 |
| 7,263,067 B2 * | 8/2007 | Sreemanthula | H04L 1/0002 370/231 |
| 7,336,608 B2 * | 2/2008 | Sin | H04L 47/14 370/232 |

(Continued)

*Primary Examiner* — Hamza N Algibhah
*Assistant Examiner* — Tesfu N Mekonen
(74) *Attorney, Agent, or Firm* — Hovey Williams LLP (57) ABSTRACT

A computer-implemented method for automatic configuring of a network of interconnected nodes to handle electronic data traffic comprises the steps of receiving a request to transfer a block of data from a source data storage device of the network to a destination data storage device, determining a status for each data storage device and a plurality of data transmission devices, determining paths through the network from the source data storage device to the destination data storage device based upon the status of the devices, sending a prioritized configuration to each subset of data transmission devices to establish the paths from the source data storage device to the destination data storage device, sending a signal to the source data storage device to transfer the block of data to the destination data storage device, and returning the data transmission devices to a default configuration after the block of data has been transferred.

13 Claims, 4 Drawing Sheets

(56) References Cited

U.S. PATENT DOCUMENTS

| | | | | |
|---|---|---|---|---|
| 8,498,271 B2* | 7/2013 | Lee | ......................... | H04L 47/10 |
| | | | | 370/332 |
| 8,537,710 B2* | 9/2013 | Ner | ...................... | H04W 28/06 |
| | | | | 370/252 |
| 8,743,881 B2* | 6/2014 | Dai | ..................... | H04L 12/1854 |
| | | | | 370/392 |
| 8,825,605 B2* | 9/2014 | Nayak | ................... | G06F 3/0613 |
| | | | | 707/662 |
| 9,197,573 B2* | 11/2015 | Cho | ...................... | H04L 47/263 |
| 9,471,245 B1* | 10/2016 | Shilane | ............... | G06F 11/2056 |
| 9,716,659 B2* | 7/2017 | Dillon | .................... | H04L 47/22 |
| 2004/0010617 A1* | 1/2004 | Akahane | ................ | H04L 45/10 |
| | | | | 709/243 |
| 2008/0065772 A1* | 3/2008 | Tindal | .................... | H04L 29/06 |
| | | | | 709/226 |
| 2010/0296403 A1* | 11/2010 | Qiu | ...................... | H04W 28/22 |
| | | | | 370/252 |
| 2013/0322255 A1* | 12/2013 | Dillon | .................... | H04L 47/22 |
| | | | | 370/236 |
| 2013/0336213 A1* | 12/2013 | Mimura | ............... | H04W 40/00 |
| | | | | 370/328 |
| 2016/0294669 A1* | 10/2016 | Chow | .................. | H04L 41/083 |

* cited by examiner

METHOD, DEVICE, AND COMPUTER-READABLE MEDIUM FOR AUTOMATIC NETWORK TRAFFIC ENGINEERING

RELATED APPLICATIONS

The current patent application is a non-provisional patent application which claims priority benefit with regard to all common subject matter to U.S. Provisional Application Ser. No. 62/111,446, titled "METHOD, DEVICE, AND COMPUTER-READABLE MEDIUM FOR AUTOMATIC NETWORK TRAFFIC ENGINEERING", filed Feb. 3, 2015; and U.S. Provisional Application Ser. No. 62/147,749, titled "METHOD, DEVICE, AND COMPUTER-READABLE MEDIUM FOR AUTOMATIC NETWORK TRAFFIC ENGINEERING", filed Apr. 15, 2015. The listed earlier-filed provisional applications are hereby incorporated by reference in their entireties into the current patent application.

FIELD OF THE INVENTION

The present disclosure generally relates to methods and devices for managing electronic data traffic and, more particularly to methods and devices for automatically configuring networks to optimize the transfer of electronic data traffic between network nodes, such as nodes potentially located in multiple geographically dispersed data centers.

BACKGROUND

High priority, large volume data transfers involve moving or copying data from one node of a network in a first location to another node of the network in a second location. The size of the data to be transferred may range from hundreds of gigabytes to tens of terabytes. Furthermore, the data is usually required to be moved within a predetermined period of time. Current network configurations may be unable to handle this type of time limited, high volume data transfer in an automated fashion and may suffer from other deficiencies.

BRIEF SUMMARY

Embodiments of the present technology relate to computer-implemented methods, network computing devices, and computer-readable media for automatic configuring of a network of interconnected nodes to handle electronic data traffic. The embodiments provide for setting up and managing a plurality of data transmission devices to transfer a large block of data from a source data storage device to a destination data storage device. The data transmission devices may be configured to give the highest priority to the large block of data being transferred. After the large block of data is transferred, the data transmission devices may be restored to a default or previous configuration.

In a first aspect, a computer-implemented method for automatic configuring of a network of interconnected data storage devices and data transmission devices to handle electronic data traffic may be provided. The method may include: (1) receiving from a software application a request to transfer a block of data from a source data storage device of the network to a destination data storage device of the network. The request may include an indication of a size of the block of data and/or a maximum time period during which the block of data should be transferred. The method may include: (2) determining whether the block of data may be transferred in the required period of time from the source data storage device to the destination data storage device along a default path using a default configuration. The method may include: (3) sending a prioritized configuration to each of the data storage devices and data transmission devices along the default path from the source data storage device to the destination data storage device if the block of data cannot be transferred in the required period of time along the default path using the default configuration; (4) sending a signal to the source data storage device to transfer the block of data to the destination data storage device; and/or (5) returning the data transmission devices to a default configuration after the block of data has been transferred from the source data storage device to the destination data storage device such that electronic data transfer is facilitated. The method may include additional, fewer, or alternative actions, including those discussed elsewhere herein.

In another aspect, a computer-readable medium for automatic configuring of a network of interconnected data storage devices and data transmission devices to handle electronic data traffic may be provided. The computer-readable medium may include an executable program stored thereon, wherein the program instructs a processing element of a network computing device to perform the following steps: (1) receiving from a software application a request to transfer a block of data from a source data storage device of the network to a destination data storage device of the network, wherein the request includes an indication of a size of the block of data and a maximum time period value defining a size of the block of data and/or a maximum time period during which the block of data should be transferred; (2) determining whether the block of data may be transferred in the required period of time from the source data storage device to the destination data storage device along a default path using a default configuration; (3) sending a prioritized configuration to each of the data storage devices and data transmission devices along the default path from the source data storage device to the destination data storage device if the block of data cannot be transferred in the required period of time along the default path using the default configuration; (4) sending a signal to the source data storage device to transfer the block of data to the destination data storage device; and/or (5) returning the data transmission devices to a default configuration after the block of data has been transferred from the source data storage device to the destination data storage device to facilitate electronic data transfer. The program stored on the computer-readable medium may instruct the processing element to perform additional, fewer, or alternative actions, including those discussed elsewhere herein.

In yet another aspect, a network computing device for automatic configuring of a network of interconnected data storage devices and data transmission devices to handle electronic data traffic may be provided. The network computing device may include a communication element, a memory element, and/or a processing element. The communication element may receive and transmit communications to and from a plurality of data storage devices and a plurality of data transmission devices. The memory element may be electronically coupled to the communication element and may store executable instructions. The processing element may be electronically coupled to the communication element and the memory element. The processing element may be configured to receive from a software application a request to transfer a block of data from a source data storage device to a destination data storage device, the request including an indication of a size of the block of data and/or a maximum time period value defining a size of the block of data, and/or a maximum time period during which the block of data should be transferred; determine whether the block of data may be transferred in the required period of time from the source data storage device to the destination data storage device along a default path using a default configuration; send a prioritized configuration to each of the data storage devices and data transmission devices along the default path from the source data storage device to the destination data storage device if the block of data cannot be transferred in the required period of time along the default path using the default configuration; send a signal to the source data storage device to transfer the block of data to the destination data storage device; and/or return the data transmission devices to a default configuration after the block of data has been transferred from the source data storage device to the destination data storage device. The network computing device may include additional, fewer, or alternate components and/or functionality, including that discussed elsewhere herein.

In yet another aspect, a software application for automatic configuring of a network of interconnected data storage devices and data transmission devices to handle electronic data traffic may be provided. The software application may comprise a network path discovery agent, a quality of service discovery agent, a network health agent, and/or a network path and quality of service determination agent. The network path discovery agent may determine a plurality of paths through which to transfer a block of data from a source data storage device to a destination data storage device, wherein the determination is based upon a current configuration of the network. The quality of service discovery agent may determine current quality of service settings for the data storage devices and a plurality of data transmission devices along the paths. The network health agent may determine a current performance status of the network. The network path and quality of service determination agent to determine an optimal path from the source data storage device to the destination data storage device based on data received from the network path discovery agent, the quality of service discovery agent, and the network health agent. The agents may be computer-readable or computer-executable instructions, computer applications, and/or computer-executable instruction modules stored on non-transitory computer-readable media or medium. The software application may include additional, less, or alternate functionality, including that discussed elsewhere herein.

Advantages of these and other embodiments will become more apparent to those skilled in the art from the following description of the exemplary embodiments which have been shown and described by way of illustration. As will be realized, the present embodiments described herein may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of devices and methods disclosed therein. It should be understood that each Figure depicts an embodiment of a particular aspect of the disclosed system and methods, and that each of the Figures is intended to accord with a possible embodiment thereof. Further, wherever possible, the following description refers to the reference numerals included in the following Figures, in which features depicted in multiple Figures are designated with consistent reference numerals. The present embodiments are not limited to the precise arrangements and instrumentalities shown in the Figures.

The Figures depict exemplary embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments described in this patent application and other possible embodiments may relate to, inter alia, devices and methods for transferring large volumes of data from a source data storage device through a network to a destination data storage device. The network may be a computer network that includes the source and destination data storage devices as well as other data storage devices and a plurality of data transmission devices. Each data storage device is typically a data server, but may also be a desktop or workstation computer or the like. Each data transmission device may be a hub, a switch, a router, or the like, which generally has a plurality of input ports and a plurality of output ports. Each of the input ports may be connected to one or more output ports. A user may run an application or software program on an electronic device, such as a desktop computer, a tablet, a smartphone, or the like, which is used to request the transfer of a large volume of data from the source data storage device to the destination data storage device. The transfer may be required to move data from one physical location to another or one system to another, to copy or backup data, to update records, or the like. The volume of data may be in the range of hundreds of gigabytes to tens of terabytes. In addition, there may be a limited amount of time during which the transfer can be performed.

The data transfer request may be transmitted from the electronic device to a network computing device that acts as a network controller. The data transfer request may include information such as a source of the block of data, a destination for the block of data, a size of the block of data to be transferred, and/or a time period during which the data should be transferred. The network computing device may first perform a threshold analysis and evaluate the requirements of the data transfer to determine if it is necessary to reconfigure the network to transfer the block of data. The network computing device may consider a minimum size of data, a maximum transfer time period, or a combination of the two, which may be a data transfer rate or throughput. For example, the network computing device may reconfigure the network if the size of the block of data is greater than the minimum size, which may be, say, 100 gigabytes (GB), or if the time allowed to transfer the block of data is less than a time period of, say, 10 minutes (min). Additionally or alternatively, the network computing device may reconfigure the network if the data transfer rate, which is the quotient of the size of the block of data and the allowed time period, is greater than a minimum value of, say, 10 GB/min.

If the requirements of the request fall below these thresholds, then the block of data may be transferred with normal network priority levels that receive no reconfiguration or other actions from the network computing device. Alternatively, the application running on the electronic device which makes the transfer request may perform the threshold analysis described above and may only send the request to the network computing device if the requirements of the request are above the thresholds. The data size, the time period, and/or the data transfer rate thresholds discussed herein are merely exemplary and may be replaced with other values.

The network computing device may be in communication, either directly or indirectly, with all of the data storage devices and data transmission devices connected to the network. The network computing device may query all of the data storage devices and data transmission devices and may receive a current status of each component. The status may include a listing of operations or jobs currently performed or planned, as well as performance specifications such as bandwidth, throughput, latency, jitter, and the like.

The network computing device may evaluate the requirements of the data transfer and the status of the network components, and may determine whether the transfer can be completed within the requirements. If not, then the network computing device may generate an alert to the user that the block of data cannot be transferred in the required time period. If so, then the computing device may perform an algorithm, apply business rules, and/or analyze various factors (such as loading, priorities, available resources, time of day, scheduled maintenance, time requirements, size of data to be transferred, the health of the network, and/or other factors) to analyze the network. The algorithm, business rules, and/or computer analysis of various system, component, resource, and/or operational factors may take into consideration factors such as the round trip times, total latency, and/or delay time for various paths that exist between the source data storage device and the destination data storage device.

The network may include a default path between the source data storage device and the destination data storage device. If the default path meets the criteria for the data transfer based upon the aforementioned analysis, then the default path may be considered the optimal path. If the default path does not meet the criteria for the data transfer, then the network computing device may transmit configuration information to each data transmission device along the default path, or other paths, that includes settings to change the performance or configuration of the data transmission devices. This may involve adjusting, inter alia, a quality of service (QoS), transmission control protocol (TCP), internet protocol (IP) settings or other settings. Once the configuration is set for the appropriate data transmission devices, the network computing device may signal the source data storage device to begin transmitting the block of data.

As data flows from the source data storage device to the destination data storage device through the subset of data transmission devices, the network computing device may receive progress updates, such as the amount of data that has been received by the destination data storage device. If the network computing device determines that, based upon the current rate of data transfer, the block of data will not be transferred before the required time period has elapsed, then the network computing device may determine alternative or additional paths, including data transmission devices and the links therebetween, for the data to follow. When the block of data has been completely transferred from the source data storage device to the destination data storage device, the network computing device may reconfigure each data transmission device of the subset to return its settings to a default configuration or to a configuration that it had before the transfer of the block of data was requested.

Specific embodiments of the technology will now be described in connection with the attached drawing figures. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

I. EXEMPLARY NETWORK COMPUTING DEVICE

Figure 1:
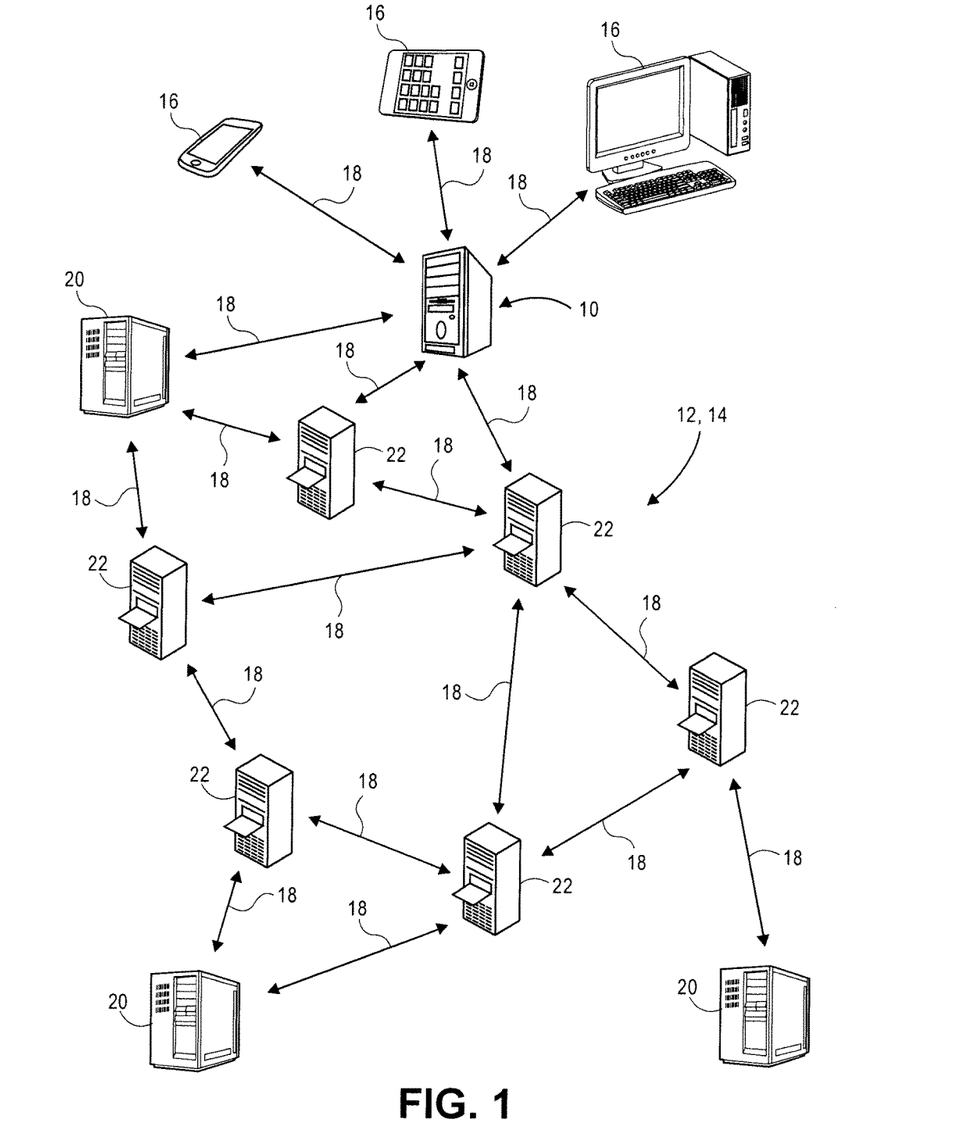
FIG. 1 illustrates a plurality of electronic devices and an exemplary computer network of interconnected data transmission devices and data storage devices with which various embodiments of a network computing device may interact.

FIG. 1 depicts an exemplary environment in which embodiments of a network computing device 10 may be utilized. The environment may include a network 12 of interconnected nodes 14 and one or more electronic devices 16. The network computing device 10 may automatically configure and monitor the operation of the network 12 for transferring a large block of data from a source node 14 to a destination node 14. The transfer of the block of data may be requested by the electronic device 16, such as a desktop computer, a tablet, a smartphone, or the like. The electronic device 16 may be running or executing an application or software that requires data to be moved from one physical location to another or one system to another, to copy or backup data, to update records, or the like. The volume of data may be in the range from hundreds of gigabytes to tens or hundreds of terabytes. In addition, there may be a limited amount of time during which the transfer can be performed.

The network 12 may be embodied by a local, metro, or wide area network (LAN, MAN, or WAN) and may be formed using a plurality of known architectures and topologies. In some embodiments, a portion of the network 12 may be formed by at least a portion of the Internet, by communication lines that are leased from other entities, or by combinations thereof. The network 12 may be implemented within a small space such as an office or a building or across a larger space such as a city, a region, or a country. The network 12 may include the source and destination nodes 14 as well as a plurality of other nodes 14 and a plurality of interconnecting links 18. In addition, links 18 may exist between the network computing device 10 and the network 12, as well as the electronic devices 16 and the network computing device 10.

Each node 14 of the network 12 may be a data storage device 20 or a data transmission device 22. The data storage device 20 generally stores data and is typically embodied by a data server and may include storage area networks, application servers, database servers, file servers, gaming servers, mail servers, print servers, web servers, or the like, or combinations thereof. The data storage device 20 may be additionally or alternatively embodied by computers, such as desktop computers, workstation computers, or the like.

In addition, the data storage device 20 may be configured to transmit and receive data to and from other devices. The data storage device 20 may have various performance specifications such as bandwidth available, jitter, latency, capacity or throughput, and the like. Furthermore, the data storage device 20 may have one or more currently running jobs, as well as a queue of planned jobs for the future.

The data transmission device 22 generally forwards or passes data, including data packets, through the network 12 and may be embodied by a hub, a switch, a network switch, a router, or the like. The data transmission device 22 may also temporarily store or buffer data before the data is forwarded. The data transmission device 22 may operate as an Open Systems Interconnection (OSI) layer-2 device, a layer-3 device, or combination of both. The data transmission device 22 may have a plurality of input ports and a plurality of output ports, wherein each of the input ports may be connected to one or more output ports.

The data transmission device 22 may further have the ability to set priorities or a quality of service (QoS) on the flow of data through the device. For example, data packets which include a particular flag, are from a particular source, or are bound for a particular destination may be forwarded in advance of other data packets or may be forwarded at a higher frequency or datarate. Like the data storage device 20, the data transmission device 22 may have various performance specifications and job schedules similar to those discussed above.

The link 18, generally indicated in FIG. 1 as a double arrowhead line, between any two nodes 14, any node 14 and the network computing device 10, or any electronic device 16 and the network computing device 10 may be formed using wires, such as electrically conductive cables or fiber optic cables, or wirelessly, such as radio frequency (RF) communication using wireless standards such as cellular 2G, 3G, or 4G, Institute of Electrical and Electronics Engineers (IEEE) 802.11 standards such as WiFi, IEEE 802.16 standards such as WiMAX, Bluetooth™, or combinations thereof. In various embodiments, each data transmission device 22 may be in communication with at least one other data transmission device 22 and, optionally, one or more data storage devices 20. Each data storage device 20 may be in communication with at least one data transmission device 22 and, optionally, one or more other data storage devices 20. Thus, the connection architecture of the network 12 allows any node 14 to communicate with any other node 14 either directly or indirectly. Furthermore, the connection architecture of the network 12 creates one or more paths between any two nodes 14, wherein each path includes the data storage devices 20 or data transmission devices 22 at the endpoints of the path plus the nodes 14 and links 18 that form a unique route between the endpoint nodes 14.

Figure 2:
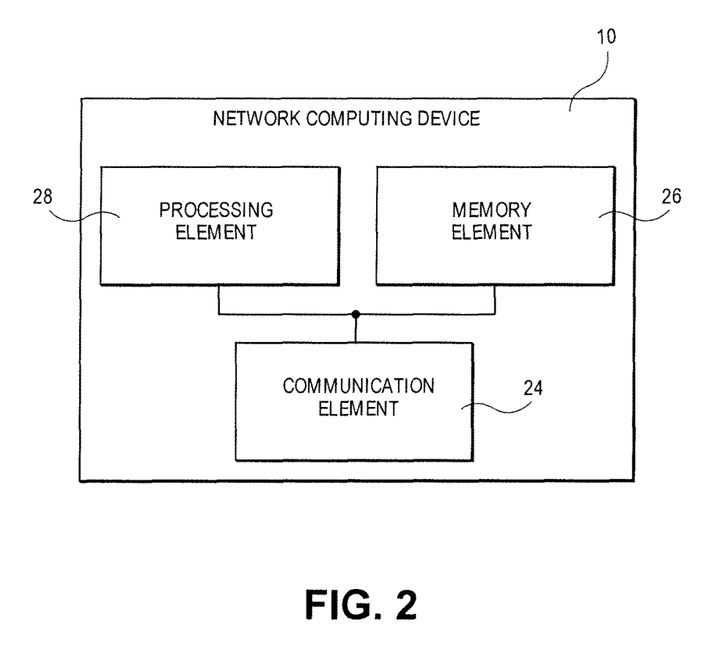
FIG. 2 illustrates various components of the network computing device shown in block schematic form.

The network computing device 10, as shown in FIGS. 1 and 2, generally manages the transfer of large blocks of data between data storage devices 20 and may include a communication element 24, a memory element 26, and a processing element 28.

The communication element 24 generally allows communication with external systems or devices. The communication element 24 may include signal or data transmitting and receiving circuits, such as antennas, amplifiers, filters, mixers, oscillators, digital signal processors (DSPs), and the like. The communication element 24 may establish communication wirelessly by utilizing RF signals and/or data that comply with communication standards such as cellular 2G, 3G, or 4G, IEEE 802.11 standard such as WiFi, IEEE 802.16 standard such as WiMAX, Bluetooth™, or combinations thereof. Alternatively, or in addition, the communication element 24 may establish communication through connectors or couplers that receive metal conductor wires or cables which are compatible with networking technologies such as ethernet. In certain embodiments, the communication element 24 may also couple with optical fiber cables. The communication element 24 may be in communication with or electronically coupled to the memory element 26 and the processing element 28.

The memory element 26 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, universal serial bus (USB) drives, or the like, or combinations thereof. The memory element 26 may include, or may constitute, a "computer-readable medium". The memory element 26 may store the instructions, code, code segments, software, firmware, programs, applications, apps, services, daemons, or the like that are executed by the processing element 28. The memory element 26 may also store settings, data, documents, sound files, photographs, movies, images, databases, and the like.

The processing element 28 may include processors, microprocessors, microcontrollers, DSPs, field-programmable gate arrays (FPGAs), analog and/or digital application-specific integrated circuits (ASICs), or the like, or combinations thereof. The processing element 28 may generally execute, process, or run instructions, code, code segments, software, firmware, programs, applications, apps, processes, services, daemons, or the like. The processing element 28 may also include hardware components such as finite-state machines, sequential and combinational logic, and other electronic circuits that can perform the functions necessary for the operation of embodiments of the current invention. The processing element 28 may be in communication with the other electronic components through serial or parallel links that include address busses, data busses, control lines, and the like.

Through hardware, software, firmware, or various combinations thereof, the processing element 28 may be configured to perform the following operations. The processing element 28 may receive a request for a transfer of a block of data from the application being executed by the electronic device 16. The request may identify a source data storage device 20 of the block of data, a destination data storage device 20 for the block of data, a size of the block of data, and/or a time period during which the block of data should be transferred. The time period may include times of the day during which the transfer should occur or a maximum value of time for the transfer to be completed. The processing element 28 may query at least the source and destination data storage devices 20 and the data transmission devices 22 to receive data or information regarding the status and performance of each one.

In various embodiments, the processing element 28 may also acquire or have access to information regarding the topology of the network 12, such as the specific connections that form the links 18 between each of the data transmission devices 22 and the delay or travel time for each connection. This information is necessary, in part, because, as shown in FIG. 1, each node 14 of the network 12 may typically be connected to only a portion (perhaps only a small portion) of the other nodes 14.

In some embodiments, the processing element 28 may first evaluate the requirements of the data transfer to determine if it is necessary to reconfigure the network 12 to transfer the block of data. The processing element 28 may consider a minimum size of data, a maximum value of a time period, or a combination of the two, which may be a data transfer rate or throughput. For example, the processing element 28 may perform the actions discussed below if the size of the block of data is greater than the minimum size, which may be, say, 100 GB, or if the time allowed to transfer the block of data is less than a time period of, say, 10 min. Additionally or alternatively, the processing element 28 may perform the actions discussed below if the data transfer rate, which is the quotient of the size of the block of data and the allowed time period, is greater than a minimum value of, say, 10 GB/min. If the requirements of the request fall below these thresholds, then the block of data may be transferred with normal network priority levels that receive no reconfiguration or other actions from the network computing device 10.

In other embodiments, the application running on the electronic device 16 which makes the transfer request may perform the analysis just described above and may only send the request to the network computing device 10 if the requirements of the request are above the thresholds.

Based upon the size of the block of data, the time period required for the transfer, and the status and performance of the network 12, the processing element 28 may determine whether the transfer of data may be completed within the constraints. The determination may include calculating a minimum aggregate data throughput or transfer rate, and/or whether the network 12 can provide the minimum data throughput. If not, then the processing element 28 may generate an alert that is transmitted to the electronic device 16 of the user. The alert may notify the user that the block of data cannot be transferred in the required time. If possible, the user may be allowed the opportunity to adjust the size of the block of data, the time period required for the transfer, or both. Otherwise, the user may simply have to wait until a later time to resubmit his request.

If the processing element 28 determines that the block of data can be transferred within the constraints, then the processing element 28 may determine the optimal path or paths through the network 12 from the source data storage device 20 to the destination data storage device 20 for the block of data to be transferred. The processing element 28 may implement an optimization algorithm and/or other computer analysis that may consider the type of data to be transferred and may measure timing specifications such as latency, bandwidth, including inbound and outbound bandwidth utilization, jitter, port speeds, and/or throughput as well as historical circuit performance and reliability, error rates, capacity, utilization, and status for each data storage device 20 and each data transmission device 22. The processing element 28 may also measure and/or evaluate the delay time and round trip times along the link 18 for each pair of data transmission devices 22 that are connected. For QoS considerations, the processing element 28 may measure and/or evaluate queues and queue drops. For transmission control protocol (TCP) portions of the network 12, the processing element 28 may measure and/or evaluate network device window sizes and maximum segment size (MSS) values. For internet protocol (IP) portions of the network 12, the processing element 28 may measure and/or evaluate maximum transmission unit (MTU) sizes and path MTU (PMTU) discovery. For any or all of the timing or performance specifications, the processing element 28 may send a request to the data storage devices 20 and the data transmission devices 22 to perform the measurements necessary to report the specifications. The algorithm and/or computer analysis may consider the timing specifications, such as the total latency, delay time, and round trip time for each path that exists between the source data storage device 20 and the destination data storage device 20.

The network 12 may include a default path from the source data storage device 20 to the destination data storage device 20. If the default path with default settings or configuration is the best path in view of the considerations discussed above, then the default path is utilized. If the default path with its current settings cannot meet the criteria of transferring the block of data within the time allowed, then the processing element 28 may modify settings of the data storage devices 20 and the data transmission devices 22 along the default path, or other paths, in order to meet the criteria. For example, the processing element 28 may adjust or modify the queue depth and/or the bandwidth reservation for QoS, the window sizes and/or MSS values for TCP, and the MTU and/or PMTU for IP, as well as other settings. Alternatively, the processing element 28 may determine a new path or paths with optimized settings that will meet the criteria. In some embodiments, the processing element 28 may also dynamically deploy the following services to optimize one or more paths: de-duplication services, compression services, TCP optimization services, encryption services, and others. The services may be implemented as a central service or dynamically deployed to virtualize infrastructure in a manner which optimizes placement locality. The services may also implement encryption for routing around firewalls if other security measures are implemented. In some cases, encryption may be required depending on the path selected and security requirements established by the electronic device 16 requesting the data transfer. Each path may include a subset of the data transmission devices 22 and a corresponding subset of the links 18.

When the data transmission devices 22 are configured, the processing element 28 may send a signal to the source data storage device 20 to begin transferring the block of data. The data may flow along the paths established by the network computing device 10. While data is being transferred, the network computing device 10 may monitor the progress by receiving status updates from the data transmission devices 22 involved in the transfer. If any data transmission devices 22 report a drop in throughput or a similar data transfer metric which leads to the aggregate data throughput falling below a minimum value, the network computing device 10 may readjust settings of data transmission devices 22 along the path, or may determine alternative or additional paths, including data transmission devices 22 and the links 18 therebetween, for the data to follow. Accordingly, the network computing device 10 may transmit the priority configuration to the newly-added data transmission devices 22.

Figure 4:
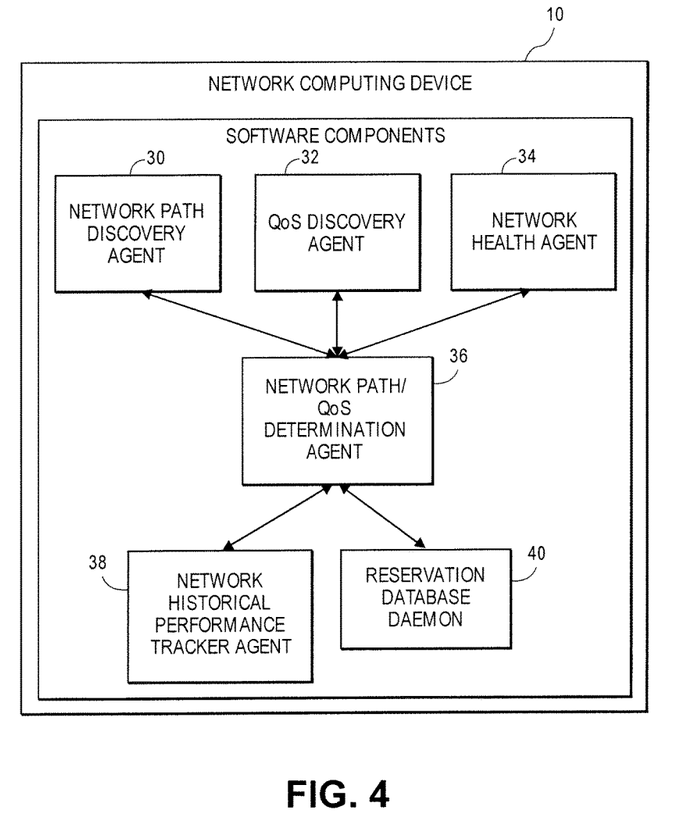
FIG. 4 illustrates various components of an exemplary software application shown in block schematic form.

In various embodiments, the processing element 28 may also utilize the following software components when determining the optimal path or paths through the network 12: a network path discovery agent 30, a QoS discovery agent 32, a network health agent 34, a network path and QoS determination agent 36, a network historical performance tracker agent 38, and/or a reservation daemon 40.

The network path discovery agent 30 may determine the path from the source data storage device 20 to the destination data storage device 20 based upon current network configurations. The network path discovery agent 30 may choose from the default path from source to destination and a list of several possible alternatives based upon the current state of the network 12.

The QoS discovery agent 32 may determine the current settings of QoS for the data storage devices 20 and the data transmission devices 22 along the paths considered by the network path discovery agent 30.

The network health agent 34 may determine the current performance status, or health, of the network 12 including outages or congestion.

The network path and QoS determination agent 36 may exchange data with the network path discovery agent 30, the QoS discovery agent 32, and/or the network health agent 34 and may determine the optimal path using the requested time for data transfer, the amount of data to be transferred, and/or the priority of the data transfer. The network path and QoS determination agent 36 may utilize a weighting algorithm which evaluates current network health, upcoming known requests, QoS settings, available routes, historical network performance, and the like. The network path and QoS determination agent 36 may store path configurations along with a reservation identification and a job identification, among others, to be utilized later.

The network historical performance tracker agent 38 may exchange data with the network path and QoS determination agent 36 and may store information about the reservation identifications, the job identifications, network congestion and performance information, temporal and seasonal based performance statistics, and the like.

The reservation daemon 40 may exchange data with the network path and QoS determination agent 36 and may establish access to a database in which data (such as the reservation identification, the job identification, the transfer date and time, the priority, a delivery service level agreement, the path through the network 12, routing information, configuration information, metric assumption information, and the like) is stored.

When the entire block of data has been transferred from the source data storage device 20 to the destination data storage device 20, the destination data storage device 20 may notify the network computing device 10 that the transfer is complete. The network computing device 10 may in turn transmit a default configuration to each of the data transmission devices 22 that were involved in the data transfer. The default configuration may include nominal values for the QoS settings. In some embodiments, the network computing device 10 may transmit a previously-held configuration to each of the data transmission devices 22 that were involved in the data transfer, wherein the previously-held configuration includes the settings each data transmission device 22 had before the transfer of the block data was initiated.

II. EXEMPLARY COMPUTER-IMPLEMENTED METHOD

Figure 3:
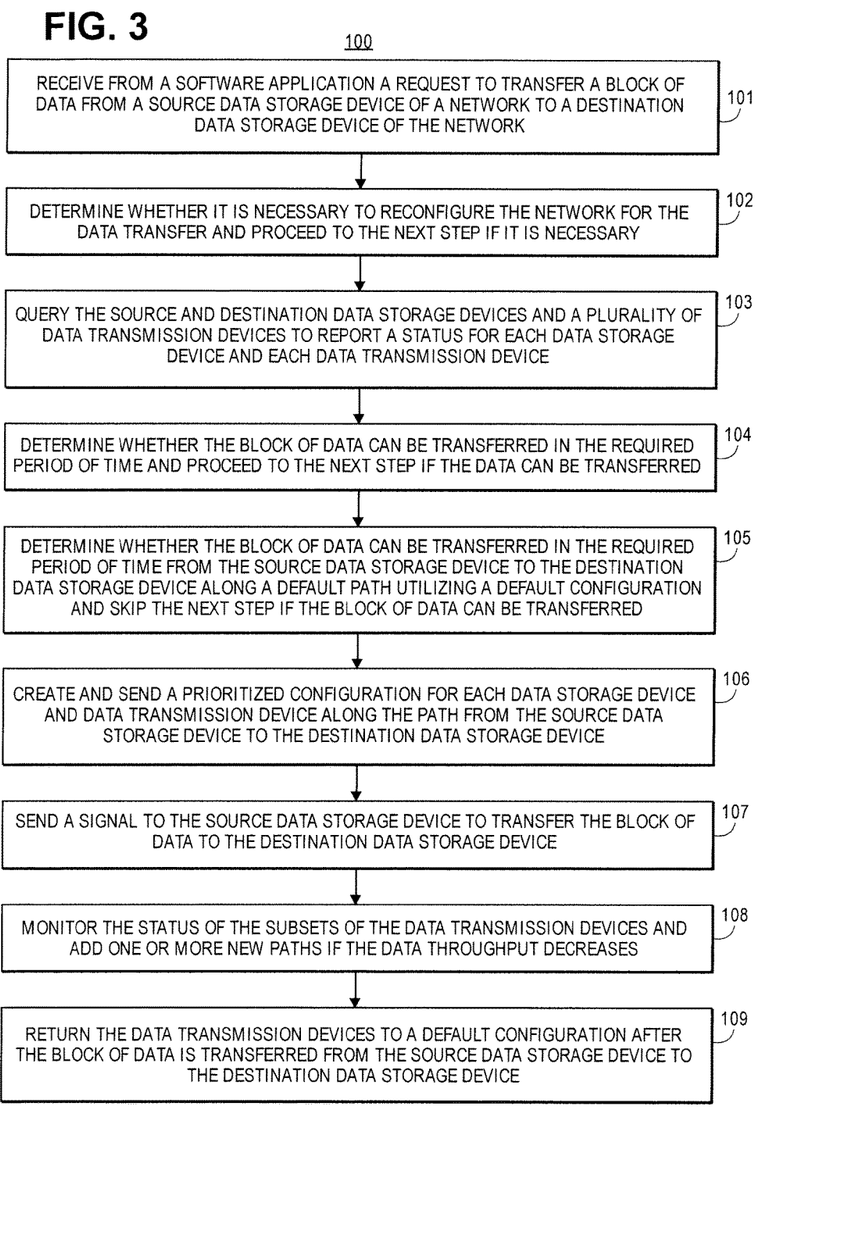
FIG. 3 illustrates at least a portion of the steps of a computer-implemented method for automatic configuring of a network of interconnected nodes to handle high volume electronic data traffic.

FIG. 3 depicts a listing of steps of an exemplary computer-implemented method 100 for automatic configuring of a network 12 of interconnected nodes 14 to handle high volume electronic data traffic. The steps may be performed in the order shown in FIG. 3, or they may be performed in a different order. Furthermore, some steps may be performed concurrently as opposed to sequentially. In addition, some steps may be optional. The steps of the computer-implemented method 100 may be performed by the network computing device 10.

Referring to step 101, a request is received by the network computing device 10 from a software application to transfer a block of data from a source data storage device 20 of the network 12 to a destination data storage device 20 of the network 12. The software application may be running or executing on a user's electronic device 16, such as a desktop computer, a tablet, a smartphone, or the like. The request may identify the source data storage device 20 of the block of data, the destination data storage device 20 for the block of data, a size of the block of data, and/or a time period during which the block of data should be transferred. The time period may include times of the day during which the transfer should occur or a maximum value of time for the transfer to be completed.

The network 12 may include the source and destination data storage devices 20 as well as a plurality of other data storage devices 20, a plurality of data transmission devices 22, and a plurality of interconnecting links 18.

Referring to step 102, a determination is made by the network computing device 10 as to whether it is necessary to reconfigure the network 12 to transfer the block of data. The network computing device 10 may consider a minimum size of data, a maximum value of a time period, or a combination of the two, which may be a data transfer rate or throughput. For example, the network computing device 10 may perform the steps discussed below if the size of the block of data is greater than the minimum size, which may be, say, 100 GB, or if the time allowed to transfer the block of data is less than a time period of, say, 10 min. Additionally or alternatively, the network computing device 10 may perform the steps discussed below if the data transfer rate, which is the quotient of the size of the block of data and the allowed time period, is greater than a minimum value of, say, 10 GB/min. If the requirements of the request fall below these thresholds, then the network computing device 10 may take no further action.

Referring to step 103, the source and destination data storage devices 20 and the data transmission devices 22 are queried by the network computing device 10 to report a status from each of the devices 20, 22. The status may include various performance specifications such as latency, bandwidth, including inbound and outbound bandwidth utilization, jitter, port speeds and/or throughput as well as historical circuit performance and reliability, error rates, capacity, utilization, and status for each device 20, 22. The specifications may be measured by one or more of the individual devices 20, 22. Furthermore, the status may include currently running jobs, as well as a queue of planned jobs for the future. In various embodiments, information regarding the topology of the network 12, such as the specific connections between each of the data transmission devices 22 and the delay or travel time for each connection may be available.

Referring to step 104, a determination is made by the network computing device 10 as to whether the block of data can be transferred from the source data storage device 20 to the destination data storage device 20 in the required period of time. The determination may be based upon the performance parameters discussed in step 103 as well as the type of data to be transferred, the size of the block of data, the time period required for the transfer, and/or the status of the network 12 including outages and congestion. The determination may include, among other actions, calculating a minimum aggregate data throughput or transfer rate, and/or whether the network 12 can provide the minimum data throughput. If not, then the network computing device 10 may generate and transmit an alert to the electronic device 16 of the user. The alert may notify the user that the block of data cannot be transferred in the required time. If it is determined that the block of data may be transferred within the constraints, then the following steps are performed.

Referring to step 105, a determination is made by the network computing device 10 as to whether the block of data can be transferred in the required period of time from the source data storage device 20 to the destination data storage device 20 along a default path using a default configuration. If the default path from the source data storage device 20 to the destination data storage device 20 with default configurations can meet the data transfer criteria, then step 106 may be skipped. If the default path with a default configuration cannot meet the data transfer criteria, then a change of configuration settings may be required.

Referring to step 106, a prioritized configuration is created and sent by the network computing device 10 to each of the data storage devices 20 and data transmission devices 22 along the path from the source data storage device 20 to the destination data storage device 20. For example, the processing element 28 may adjust or modify the queue depth and/or the bandwidth reservation for QoS, the window sizes and/or MSS values for TCP, and the MTU and/or PMTU for IP, as well as other settings. In various embodiments, the processing element 28 may also dynamically deploy the following services to optimize one or more paths: de-duplication services, compression services, TCP optimization services, encryption services, and others. The services may be implemented as a central service or dynamically deployed to virtualize infrastructure in a manner which optimizes placement locality. The services may also implement encryption for routing around firewalls if other security measures are implemented. In some cases, encryption may be required depending on the path selected and security requirements established by the electronic device 16 requesting the data transfer. In some embodiments, the processing element 28 may determine a new path or paths with optimized settings that will meet the criteria.

Referring to step 107, a signal is sent by the network computing device 10 to the source data storage device 20 to transfer the block of data to the destination data storage device 20.

Referring to step 108, the status of the subsets of data transmission devices 22 is monitored by the network computing device 10 during the transfer of the block of data. If any data transmission devices 22 report a drop in throughput or a similar data transfer metric which leads to the aggregate data throughput falling below a minimum value, then the network computing device 10 may determine alternative or additional paths, including data transmission devices 22 and the links 18 therebetween, for the data to follow. Accordingly, the network computing device 10 may transmit the priority configuration to the newly-added data transmission devices 22.

Referring to step 109, the settings of the data transmission devices 22 are returned to a default setting by the network computing device 10 after the block of data has been transferred from the source data storage device 20 to the destination data storage device 20. In some embodiments, a previously-held configuration may be transmitted to each of the data transmission devices 22 that were involved in the data transfer, wherein the previously-held configuration includes the settings each data transmission device 22 had before the transfer of the block data was initiated.

III. EXEMPLARY SOFTWARE APPLICATION

FIG. 4 illustrates at least a portion of the components of a software application for automatic configuring of a network 12 of interconnected data storage devices 20 and data transmission devices 22 to handle electronic data traffic. The components may be implemented to determine and configure an optimal path from a source data storage device 20 to a destination data storage device 20 to be utilized during a data transfer. The components may be stored in the memory element 26 of the network computing device 10 and may be executed by the processing element 28. The components may broadly comprise a network path discovery agent 30, a QoS discovery agent 32, a network health agent 34, a network path and QoS determination agent 36, a network historical performance tracker agent 38, and/or a reservation daemon 40. Additional, fewer, or alternate components may be employed.

The network path discovery agent 30 may determine a plurality of paths from the source data storage device 20 to the destination data storage device 20 based upon current network configurations. The paths may include the default path from source to destination and a list of several possible alternatives based upon the current state of the network 12.

The QoS discovery agent 32 may determine the current settings of QoS for the data storage devices 20 and the data transmission devices 22 along the paths considered by the network path discovery agent 30.

The network health agent 34 may determine the current performance status, or health, of the network 12 including outages, such as data storage devices 20, data transmission devices 22, or links 18 that are non-functional, or congestion, such as a large amount of data being buffered while waiting to pass through a link 18 or a data transmission device 22.

The network path and QoS determination agent 36 may exchange data with the network path discovery agent 30, the QoS discovery agent 32, and the network health agent 34 and/or may determine the optimal path using the requested time for data transfer, the amount of data to be transferred, and/or the priority of the data transfer. The network path and QoS determination agent 36 may utilize a weighting algorithm which evaluates current network health or performance, upcoming known requests, QoS settings, available paths, historical network performance, and the like. The network path and QoS determination agent 36 may store path configurations along with a reservation identification and a job identification, among others, to be utilized later.

The network historical performance tracker agent 38 may exchange data with the network path and QoS determination agent 36 and may store information about the reservation identifications, the job identifications, network congestion and performance information, temporal and seasonal based performance statistics, and the like.

The reservation daemon 40 may exchange data with the network path and QoS determination agent 36 and may establish access to a database in which terms of the data transfer and configuration information such as the reservation identification, the job identification, the transfer date and time, the priority, a delivery service level agreement, the path through the network 12, routing information, metric assumption information, and the like are stored.

IV. EXEMPLARY COMPUTER-IMPLEMENTED METHOD FOR AUTOMATIC CONFIGURING OF A NETWORK OF INTERCONNECTED NODES TO HANDLE HIGH VOLUME ELECTRONIC DATA TRAFFIC

In a first aspect, a computer-implemented method for automatic configuring of a network of interconnected data storage devices and data transmission devices to handle electronic data traffic may be provided. The method may include: (1) receiving from a software application a request to transfer a block of data from a source data storage device of the network to a destination data storage device of the network, wherein the request includes an indication of a size of the block of data and a maximum time period value defining a size of the block of data and a maximum time period during which the block of data should be transferred; (2) determining a status for each data storage device and a plurality of data transmission devices; (3) determining whether the block of data may be transferred in the required period of time from the source data storage device to the destination data storage device along a default path using a default configuration; (4) determining whether the block of data can be transferred in the required period of time from the source data storage device to the destination data storage device along a default path using a default configuration; (5) sending a signal to the source data storage device to transfer the block of data to the destination data storage device; and/or (6) returning the data transmission devices to a default configuration after the block of data has been transferred from the source data storage device to the destination data storage device. The method may include additional, fewer, or alternative actions, including those discussed elsewhere herein.

For instance, the method may include: determining whether the size of the block of data and the maximum time period exceed predetermined thresholds for changing a configuration of the data transmission devices and continuing if the thresholds are exceeded; querying each data storage device and data transmission device to report their status; and/or monitoring the status of each of the data transmission devices and adding data transmission devices to the default path if an aggregate data throughput falls below a minimum value. In addition, the status of each data transmission device may include: (1) a latency of data flow through the data transmission device; (2) a jitter of data flow through the data transmission device; (3) a bandwidth of data flow through the data transmission device; and/or (4) a capacity of data flow through the data transmission device. The status of each data storage device may include a listing of currently running jobs; and/or a listing of planned jobs. The prioritized configuration for each of the data transmission devices may include modifying a queue depth and a bandwidth reservation for quality of service, modifying window sizes and maximum segment size values for transmission control protocol, and modifying a maximum transmission unit and/or a path maximum transmission unit discovery for internet protocol. The prioritized configuration for each of the data transmission devices may further include deploying services including de-duplication services, compression services, TCP optimization services, and/or encryption services.

V. EXEMPLARY COMPUTER-READABLE MEDIUM FOR AUTOMATIC CONFIGURING OF A NETWORK OF INTERCONNECTED NODES TO HANDLE HIGH VOLUME ELECTRONIC DATA TRAFFIC

In another aspect, a computer-readable medium for automatic configuring of a network of interconnected data storage devices and data transmission devices to handle electronic data traffic may be provided. The computer-readable medium may include an executable program stored thereon, wherein the program instructs a processing element of a network computing device to perform the following steps: (1) receiving from a software application a request to transfer a block of data from a source data storage device of the network to a destination data storage device of the network, wherein the request includes an indication of a size of the block of data and a maximum time period value defining a size of the block of data and a maximum time period during which the block of data should be transferred; (2) determining a status for each data storage device and a plurality of data transmission devices; (3) determining whether the block of data can be transferred in the required period of time from the source data storage device to the destination data storage device along a default path using a default configuration; (4) determining whether the block of data can be transferred in the required period of time from the source data storage device to the destination data storage device along a default path using a default configuration; (5) sending a signal to the source data storage device to transfer the block of data to the destination data storage device; and/or (6) returning the data transmission devices to a default configuration after the block of data has been transferred from the source data storage device to the destination data storage device. The program stored on the computer-readable medium may instruct the processing element to perform additional, fewer, or alternative actions, including those discussed elsewhere herein.

For instance, the program may instruct the processing element to: determine whether the size of the block of data and the maximum time period exceed predetermined thresholds for changing a configuration of the data transmission devices and continue if the thresholds are exceeded; query each data storage device and data transmission device to report their status; and/or monitor the status of each of the data transmission devices and adding data transmission devices to the default path if an aggregate data throughput falls below a minimum value. In addition, the status of each data transmission device may include a latency of data flow through the data transmission device; a jitter of data flow through the data transmission device; a bandwidth of data flow through the data transmission device; and/or a capacity of data flow through the data transmission device. The status of each data storage device may include a listing of currently running jobs, and/or a listing of planned jobs. The prioritized configuration for each of the data transmission devices may include modifying a queue depth and a bandwidth reservation for quality of service, modifying window sizes and maximum segment size values for transmission control protocol, and modifying a maximum transmission unit and a path maximum transmission unit discovery for internet protocol. The prioritized configuration for each of the data transmission devices may further include deploying services including de-duplication services, compression services, TCP optimization services, and encryption services.

VI. EXEMPLARY NETWORK COMPUTING DEVICE FOR AUTOMATIC CONFIGURING OF A NETWORK OF INTERCONNECTED NODES TO HANDLE HIGH VOLUME ELECTRONIC DATA TRAFFIC

In yet another aspect, a network computing device for automatic configuring of a network of interconnected data storage devices and data transmission devices to handle electronic data traffic may be provided. The network computing device may include a communication element, a memory element, and a processing element. The communication element may receive and transmit communications to and from a plurality of data storage devices and a plurality of data transmission devices. The memory element may be electronically coupled to the communication element and may store executable instructions. The processing element may be electronically coupled to the communication element and the memory element. The processing element may be configured to receive from a software application a request to transfer a block of data from a source data storage device to a destination data storage device, the request including an indication of a size of the block of data and a maximum time period value defining a size of the block of data and a maximum time period during which the block of data should be transferred; determine a status for each data storage device and the data transmission devices; determine whether the block of data can be transferred in the required period of time from the source data storage device to the destination data storage device along a default path using a default configuration; determine whether the block of data can be transferred in the required period of time from the source data storage device to the destination data storage device along a default path using a default configuration; send a signal to the source data storage device to transfer the block of data to the destination data storage device; and/or return the data transmission devices to a default configuration after the block of data has been transferred from the source data storage device to the destination data storage device. The network computing device may include additional, fewer, or alternate components and/or functionality, including that discussed elsewhere herein.

For instance, the processing element may be further configured to: determine whether the size of the block of data and the maximum time period exceed predetermined thresholds for changing a configuration of the data transmission devices and continue if the thresholds are exceeded; query each data storage device and data transmission device to report their status; and/or monitor the status of each of the data transmission devices and adding data transmission devices to the default path if an aggregate data throughput falls below a minimum value. In addition, the status of each data transmission device may include a latency of data flow through the data transmission device; the status of each data transmission device includes a jitter of data flow through the data transmission device; the status of each data transmission device may include a bandwidth of data flow through the data transmission device; the status of each data transmission device may include a capacity of data flow through the data transmission device; the status of each data storage device may include a listing of currently running jobs; the status of each data storage device may include a listing of planned jobs; the prioritized configuration for each of the data transmission devices may include modifying a queue depth and a bandwidth reservation for quality of service, modifying window sizes and maximum segment size values for transmission control protocol, and modifying a maximum transmission unit and a path maximum transmission unit discovery for internet protocol. The prioritized configuration for each of the data transmission devices may further include deploying services including de-duplication services, compression services, TCP optimization services, and encryption services.

VII. EXEMPLARY SOFTWARE APPLICATION FOR AUTOMATIC CONFIGURING OF A NETWORK OF INTERCONNECTED NODES TO HANDLE HIGH VOLUME ELECTRONIC DATA TRAFFIC

In another aspect, a software application for automatic configuring of a network of interconnected data storage devices and data transmission devices to handle electronic data traffic may be provided. The software application may comprise a network path discovery agent, a quality of service discovery agent, a network health agent, and/or a network path and quality of service determination agent. The network path discovery agent may determine a plurality of paths through which to transfer a block of data from a source data storage device to a destination data storage device, wherein the determination is based upon a current configuration of the network. The quality of service discovery agent may determine current quality of service settings for the data storage devices and a plurality of data transmission devices along the paths. The network health agent may determine a current performance status of the network. The network path and quality of service determination agent to determine an optimal path from the source data storage device to the destination data storage device based upon data received from the network path discovery agent, the quality of service discovery agent, and/or the network health agent to facilitate electronic data transfer. The software application may include additional, less, or alternate functionality, including that discussed elsewhere herein.

For instance, the software application may further comprise a network historical performance tracker agent to store information regarding temporal and seasonal based performance statistics and/or a reservation database daemon to store terms of the transfer of the block of data and the current configuration of the network. In addition, the network path and quality of service determination agent may determine the optimal path by utilizing a weighting algorithm to evaluate current network performance, upcoming known requests, quality of service settings, available paths, and/or historical network performance. The plurality of paths determined by the network path discovery agent may include a default path from the source data storage device to the destination data storage device and several alternative paths. The network health agent may determine any points of failure or congestion in the network. The agents may be computer-readable or computer-executable instructions, computer applications, and/or computer-executable instruction modules stored on non-transitory computer-readable media or medium.

VIII. ADDITIONAL EXEMPLARY EMBODIMENTS

In one aspect, a computer system and a computer-implemented method for transferring data may be provided. First, an application may signal a control system (controlling a computer environment) of the application's intent to transmit a large block of data and its minimum time requirements. Second, the control system may query the state of the network resources (such as MPLS, leased lines or Internet links) to determine a current state of the network resources (such as jitter, latency, current jobs, planned jobs, system or resource capacity, system characteristics, etc.), and/or algorithmically or otherwise (such as via computer analysis and/or based upon computing resources available, size of data transfer, time requirements, etc.) determines the most efficient path to utilize for the data transfer.

Third, the control system may effectuate the required network configurations (path(s), QoS, priority routing, priority jobs or traffic, etc.) using SDN or other technologies. For instance, the control system may communicate with various devices within the computer environment. The control system may determine available paths and/or current network settings, and/or changes to current network setting for optimal data transfer.

Fourth, during the life of the data transfer, the control system may monitor the progress and condition of the delivery elements and adjusts them accordingly to maintain optimum data throughput without impacting other traffic flows. The control system may dynamically determine additional adjustments to the system and/or path(s). For instance, the control system may dynamically monitor available system resources and/or paths, and/or dynamically change network settings or paths being used. In this respect, the control system may operate as a closed loop system that continually monitors itself during data transfer and provides itself with operational and real-time feedback to enhance performance. Additionally, if one resource is overloaded, the control system may move flow to one or more other resources, and/or if one path becomes unavailable, another available path may be selected and used for all or a portion of the data transfer.

Fifth, once the transfer is complete and acknowledged by the requesting application, the control system may re-establish the base configuration of the network by removing the component changes previously applied. The system and method may include additional, fewer, or alternate actions and functionality, including that discussed elsewhere herein.

The computer system and computer-implemented method may provide: (1) signaling between an application and control system of transfer requirements (destination host, size and minimum required transfer time, etc.); (2) querying and determining network condition in real time; (3) use of an algorithm, factors, current settings, business rules, system characteristics, system or component loading, priority routing, etc. to determine optimum path(s) and process to deliver data in a minimum time frame based upon real time network conditions; (4) automated reconfiguration of the network elements required to permit the optimized data transfer; (5) iterative monitoring of network conditions and adjustment of network elements over the transfer period; (6) signaling of transfer status and completion by the requesting application to the control system; and/or (7) automated normalization of the previously changed network elements after acknowledgement of transfer completion.

IX. ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element and other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A computer-implemented method for automatic configuring of a network of interconnected data storage devices and data transmission devices to handle electronic data traffic, the computer-implemented method comprising:
   receiving from a software application a request to transfer a block of data from a source data storage device of the network to a destination data storage device of the network, the request including an indication of a size of the block of data and a maximum time period value defining a size of the block of data and a maximum time period during which the block of data should be transferred;
   determining whether the size of the block of data and the maximum time period exceed predetermined thresholds for changing a configuration of the data transmission devices and continuing if the thresholds are exceeded;
   determining a status for each data storage device and a plurality of data transmission devices;
   determining whether the block of data can be transferred in the required period of time from the source data storage device to the destination data storage device along a default path using a default configuration;
   sending a prioritized configuration to each of the data storage devices and data transmission devices along the default path from the source data storage device to the destination data storage device if the block of data cannot be transferred in the required period of time along the default path using the default configuration;
   sending a signal to the source data storage device to transfer the block of data to the destination data storage device;
   monitoring the status of each of the data transmission devices and adding data transmission devices to the one or more paths if an aggregate data throughput falls below a minimum value, wherein the status of each data transmission device includes a latency, a jitter, a bandwidth, and a capacity of data flow through the data transmission device; and
   returning the data transmission devices to a default configuration after the block of data has been transferred from the source data storage device to the destination data storage device to facilitate electronic data transfer.

2. The computer-implemented method of claim 1, further comprising querying each data storage device and data transmission device to report their status.

3. The computer-implemented method of claim 1, wherein the status of each data storage device includes a listing of currently running jobs.

4. The computer-implemented method of claim 1, wherein the status of each data storage device includes a listing of planned jobs.

5. The computer-implemented method of claim 1, wherein the prioritized configuration for each of the data transmission devices includes modifying a queue depth and a bandwidth reservation for quality of service.

6. The computer-implemented method of claim 1, wherein the prioritized configuration for each of the data transmission devices includes modifying window sizes and maximum segment size values for transmission control protocol.

7. The computer-implemented method of claim 1, wherein the prioritized configuration for each of the data transmission devices includes modifying a maximum transmission unit and a path maximum transmission unit discovery for internet protocol.

8. The computer-implemented method of claim 1, wherein the prioritized configuration for each of the data transmission devices includes deploying services including de-duplication services, compression services, TCP optimization services, and encryption services.

9. A computer-implemented method for automatic configuring of a network of interconnected data storage devices and data transmission devices to handle electronic data traffic, the computer-implemented method comprising:
    receiving from a software application a request to transfer a block of data from a source data storage device of the network to a destination data storage device of the network, the request including an indication of a size of the block of data and a maximum time period value defining a size of the block of data and a maximum time period during which the block of data should be transferred;
    determining whether the size of the block of data and the maximum time period exceed predetermined thresholds for changing a configuration of the data transmission devices and continuing if the thresholds are exceeded;
    determining a status for each data storage device and a plurality of data transmission devices;
    determining whether the block of data can be transferred in the required period of time from the source data storage device to the destination data storage device along a default path using a default configuration;
    sending a prioritized configuration to each of the data storage devices and data transmission devices along the default path from the source data storage device to the destination data storage device if the block of data cannot be transferred in the required period of time along the default path using the default configuration;
    sending a signal to the source data storage device to transfer the block of data to the destination data storage device;
    monitoring the status of each of the data transmission devices and adding data transmission devices to the one or more paths if an aggregate data throughput falls below a minimum value; and
    returning the data transmission devices to a default configuration after the block of data has been transferred from the source data storage device to the destination data storage device.

10. The computer-implemented method of claim 9, further comprising querying each data storage device and data transmission device to report their status.

11. The computer-implemented method of claim 9, further comprising monitoring the status of each of the data transmission devices and adding data transmission devices to the default path if an aggregate data throughput falls below a minimum value.

12. The computer-implemented method of claim 9, wherein the status of each data transmission device includes a latency, a jitter, a bandwidth, and a capacity of data flow through the data transmission device.

13. A computer-implemented method for automatic configuring of a network of interconnected data storage devices and data transmission devices to handle electronic data traffic, the computer-implemented method comprising:
    receiving from a software application a request to transfer a block of data from a source data storage device of the network to a destination data storage device of the network, the request including an indication of a size of the block of data and a maximum time period value defining a size of the block of data and a maximum time period during which the block of data should be transferred;
    determining whether the size of the block of data and the maximum time period exceed predetermined thresholds for changing a configuration of the data transmission devices and continuing if the thresholds are exceeded;
    determining a status for each data storage device and a plurality of data transmission devices;
    determining whether the block of data can be transferred in the required period of time from the source data storage device to the destination data storage device along a default path using a default configuration;
    sending a prioritized configuration to each of the data storage devices and data transmission devices along the default path from the source data storage device to the destination data storage device if the block of data cannot be transferred in the required period of time along the default path using the default configuration, wherein the prioritized configuration for each of the data transmission devices includes modifying a queue depth and a bandwidth reservation for quality of service;
    sending a signal to the source data storage device to transfer the block of data to the destination data storage device;
    monitoring the status of each of the data transmission devices and adding data transmission devices to the one or more paths if an aggregate data throughput falls below a minimum value, wherein the status of each data transmission device includes a latency, a jitter, a bandwidth, and a capacity of data flow through the data transmission device; and
    returning the data transmission devices to a default configuration after the block of data has been transferred from the source data storage device to the destination data storage device.

* * * * *